United States Patent
Jain et al.

(10) Patent No.: US 9,958,921 B2
(45) Date of Patent: May 1, 2018

(54) POWER MANAGEMENT TO CHANGE POWER LIMITS BASED ON DEVICE SKIN TEMPERATURE

(71) Applicant: Advanced Micro Devices, Inc., Sunnyvale, CA (US)

(72) Inventors: Ashish Jain, Austin, TX (US); Benjamin David Bates, Austin, TX (US); Ali Akbar Merrikh, Austin, TX (US); Samuel David Naffziger, Fort Collins, CO (US); Steven Frederick Liepe, Fort Collins, CO (US); Madhu Saravana Sibi Govindan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 26 days.

(21) Appl. No.: 14/641,510

(22) Filed: Mar. 9, 2015

(65) Prior Publication Data
US 2016/0266628 A1    Sep. 15, 2016

(51) Int. Cl.
*G06F 1/28* (2006.01)
*G01K 1/14* (2006.01)
*G01K 7/42* (2006.01)
*G01K 13/00* (2006.01)

(52) U.S. Cl.
CPC .............. *G06F 1/28* (2013.01); *G01K 1/143* (2013.01); *G01K 7/42* (2013.01); *G01K 13/00* (2013.01)

(58) Field of Classification Search
None
See application file for complete search history.

(56) References Cited

U.S. PATENT DOCUMENTS

| 7,562,234 B2 | 7/2009 | Conroy et al. |
| 2005/0207081 A1* | 9/2005 | Ying .................. H01H 9/32 361/105 |
| 2006/0288241 A1* | 12/2006 | Felter .................. G06F 1/3203 713/300 |
| 2008/0165815 A1* | 7/2008 | Kamijima ............ H04N 9/3161 372/34 |
| 2010/0238124 A1* | 9/2010 | Vronay .................. G06F 3/041 345/173 |

(Continued)

FOREIGN PATENT DOCUMENTS

| EP | 0230246 | 7/1987 |
| EP | 1645928 | 4/2006 |
| KR | 10-2014-0128118 | 11/2014 |

OTHER PUBLICATIONS

International Search Report and Written Opinion correlating to PCT/US16/021504 dated Jun. 16, 2016, 15 pages.

(Continued)

*Primary Examiner* — Jaweed A Abbaszadeh
*Assistant Examiner* — Cheri Harrington

(57) ABSTRACT

A method includes controlling a power limit of a computing system based on a determined skin temperature of at least one location on an outer surface of a device housing the computing system. A processor includes a processing unit and a power management controller to control a power limit of the processing unit based on a determined skin temperature of at least one location on an outer surface of a device housing the processor.

19 Claims, 5 Drawing Sheets

(56) References Cited

U.S. PATENT DOCUMENTS

| | | | |
|---|---|---|---|
| 2010/0332876 A1* | 12/2010 | Fields, Jr. | G06F 1/3203 713/323 |
| 2011/0055596 A1 | 3/2011 | Wyatt | |
| 2011/0055597 A1 | 3/2011 | Wyatt | |
| 2011/0109655 A1* | 5/2011 | Takeda | G02F 1/133602 345/690 |
| 2011/0301778 A1 | 12/2011 | Liang et al. | |
| 2012/0049933 A1 | 3/2012 | Riechel et al. | |
| 2012/0278029 A1* | 11/2012 | Touzelbaev | G01K 7/42 702/130 |
| 2012/0306882 A1* | 12/2012 | Kashiwagi | G01D 4/00 345/440 |
| 2012/0311357 A1 | 12/2012 | Andrews | |
| 2013/0041513 A1 | 2/2013 | Cox et al. | |
| 2013/0159755 A1* | 6/2013 | Presant | G06F 1/206 713/340 |
| 2013/0246820 A1* | 9/2013 | Branover | G06F 1/3296 713/320 |
| 2013/0246827 A1* | 9/2013 | Van Essen | G06F 1/3203 713/340 |
| 2014/0006818 A1 | 1/2014 | Doshi | |
| 2014/0111913 A1 | 4/2014 | Liu | |
| 2014/0149753 A1 | 5/2014 | Park et al. | |
| 2014/0189341 A1 | 7/2014 | MacDonald | |
| 2014/0245028 A1 | 8/2014 | Chen | |
| 2014/0245032 A1 | 8/2014 | Vadakkanmaruveedu | |
| 2014/0249690 A1* | 9/2014 | Park | G06F 1/206 700/300 |
| 2014/0358318 A1 | 12/2014 | Lin et al. | |
| 2014/0359324 A1* | 12/2014 | Park | G09G 5/00 713/320 |
| 2014/0362518 A1 | 12/2014 | Huang | |
| 2015/0026495 A1 | 1/2015 | Jain | |
| 2015/0057830 A1 | 2/2015 | Slaby et al. | |
| 2015/0060429 A1 | 3/2015 | Song | |
| 2015/0075186 A1* | 3/2015 | Prajapati | F25B 21/02 62/3.7 |
| 2015/0095667 A1 | 4/2015 | Nielsen | |
| 2015/0192976 A1* | 7/2015 | Jeganathan | G06F 1/3231 713/320 |
| 2015/0241947 A1* | 8/2015 | Allen-Ware | G06F 1/3206 713/320 |
| 2015/0346785 A1* | 12/2015 | Chen | H04M 1/18 455/575.1 |
| 2016/0026231 A1* | 1/2016 | Ignowski | G06F 1/206 713/320 |
| 2016/0048181 A1* | 2/2016 | Rosenzweig | G06F 1/206 713/322 |
| 2016/0069753 A1* | 3/2016 | Phan Le | G01K 7/42 702/130 |
| 2016/0091938 A1 | 3/2016 | Edwards | |
| 2016/0098334 A1* | 4/2016 | Hariharakrishnan | G06F 11/3013 702/186 |
| 2016/0124476 A1* | 5/2016 | Mittal | G06F 1/3206 713/320 |

OTHER PUBLICATIONS

International Search Report and Written Opinion correlating to PCT/US16/021495 dated Jun. 20, 2016, 12 pages.
U.S. Appl. No. 14/641,513, filed Mar. 9, 2015, entitled "Changing Power Limits Based on Device State".
AMD's Beema and Mullins Architecture: STAPM, Lower Power, Nothing for Enthusiasts (but iVR in 2015), HWBOT. Apr. 29, 2014, 6 pages. <http://hwbot.org/news/10740_amds_beema_and_mullins_architecture_stapm_lower_power_nothing_for_enthusiasts_%28but_ivr_in_2015%29>.
Final Office Action dated Feb. 10, 2017 for U.S. Appl. No. 14/641,513.
Non-Final Office Action dated Oct. 6, 2016 for U.S. Appl. No. 14/641,513, 29 pages.
Final Office Action dated Jun. 30, 2017 for U.S. Appl. No. 14/641,513, 35 pages.
Final Office Action dated Nov. 16, 2017 for U.S. Appl. No. 14/641,513, 34 pages.

\* cited by examiner

POWER MANAGEMENT TO CHANGE POWER LIMITS BASED ON DEVICE SKIN TEMPERATURE

CROSS-REFERENCE TO RELATED APPLICATIONS

This application is related to U.S. patent application Ser. No. 14/641,513, entitled "CHANGING POWER LIMITS BASED ON DEVICE STATE" and filed on even date herewith, the entirety of which is incorporated by reference herein.

BACKGROUND

Field of the Disclosure

The disclosed subject matter relates generally to computing systems and, more particularly, to power management of a handheld processing device.

Description of the Related Art

Modern, high-performance processors include multiple heterogeneous processing units, such as central processing unit (CPU) cores and graphics processing unit (GPU) cores. Power management techniques are employed to allocate power adaptively across the processing units to produce the best performance outcome within a fixed processor power and thermal envelope.

The maximum power for a processing unit (i.e., the thermal design point (TDP)) is set based on running a heavy workload under worst-case conditions. The TDP represents an upper bound for sustainable power and is used to determine system cooling requirements to prevent the heat generated by the processing unit from damaging the components or reducing their service lifetimes.

In the case of handheld or wearable computing devices, such as tablet computers, mobile phones, smart watches, etc., the maximum operating temperature of a device is limited more by the perception of the user than by the silicon temperature limit. Heat generated by the processing units in the handheld device is conducted to the outer surfaces of the device, such as the display and the casing, where the user interfaces with the device during its operation. To provide the user with a comfortable experience, the maximum power budget allotted to the processing units is set at a fixed limit that could be less than the TDP to maintain the skin temperature of the device less than a value that the user would perceive as being too high.

The use of a static power limit is conservative and artificially reduces the performance of the device, because the static power limit is based on worst case skin temperature, i.e., a heavy workload for extended time period, while actual operating conditions do not often meet the worst case conditions.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF EMBODIMENT(S)

FIGS. 1-5 illustrate example techniques for managing resources of a computing system based on the skin temperature experienced by a user of a device including the computing system. A power limit for the computing system may be dynamically controlled based on the skin temperature to allow boosting of the components in the computing system (i.e., allowing higher frequency operation) when thermal margin exists between the determined skin temperature and a skin temperature limit, a technique referred to herein as "Skin Temperature Aware Power Management" (STAPM). The thermal headroom associated with skin temperature is time dependent, as there is a delay (i.e., thermal capacitance) between when heat generated by the computing system, represented by a junction temperature, $T_j$, is transmitted through the device to affect the skin temperature of the device, $T_{skin}$, at one or more locations. Skin temperature may be determined using temperature sensors or by using a skin temperature model. A skin temperature model may incorporate activity metric based heat power estimates for the heat generating components in the device in conjunction with a thermal model of the device to estimate the skin temperature at one or more locations. The activity metrics may be correlated to heat production for different types of resources in the device, such as an accelerated processor unit (APU), memory, a display, etc. Skin temperature limits may be fixed or variable. STAPM allows the opportunistic use of the time varying thermal headroom of the device to boost the system and hence to improve performance. An increase in boost residency by making use of the thermal headroom improves system responsiveness, especially for short and burst-oriented usage conditions.

Figure 1:
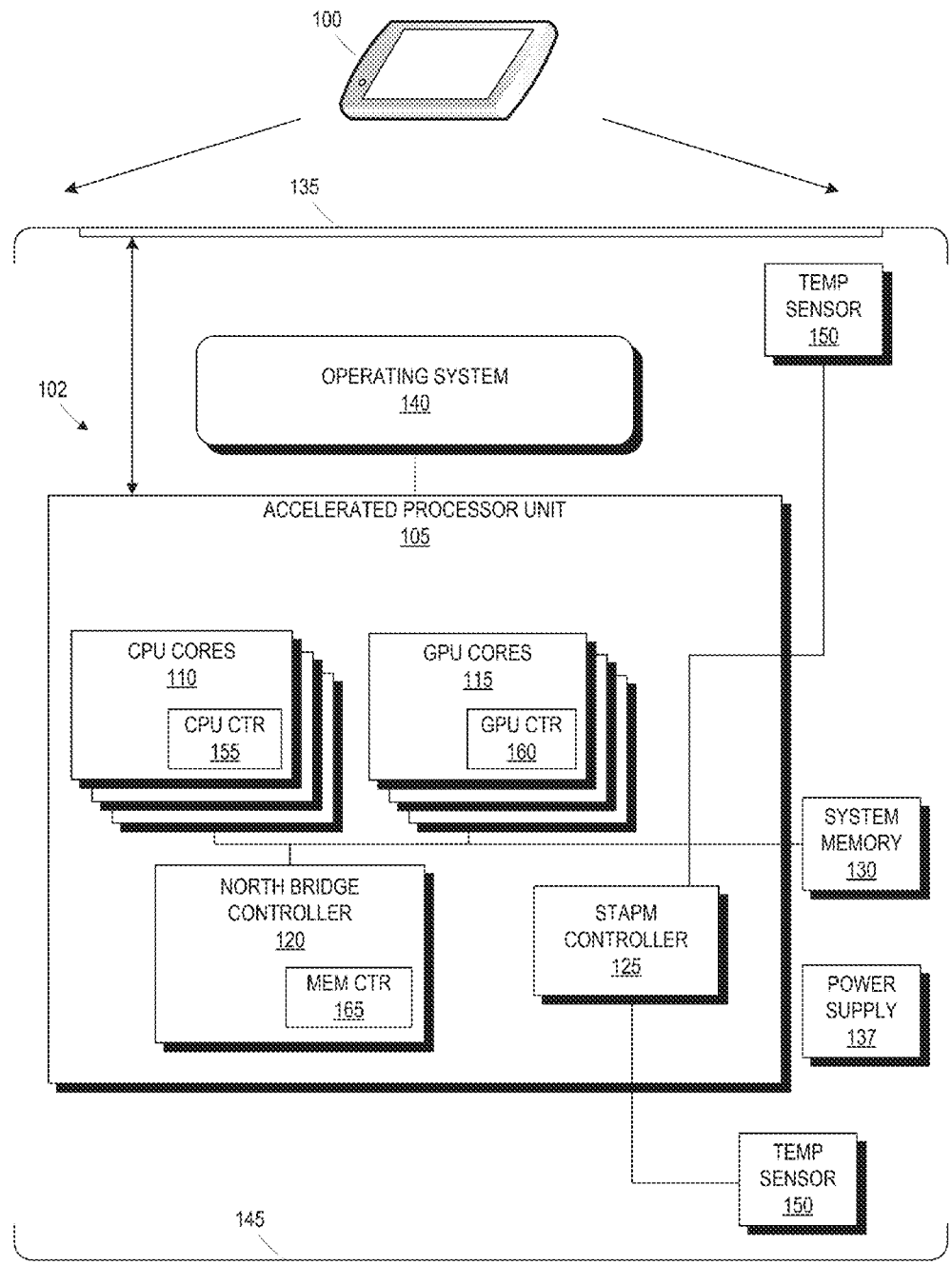
FIG. 1 is a simplified block diagram of a device including a computing system configured to implement power management to change power limits based on device skin temperature, according to some embodiments.

FIG. 1 is a block diagram of a device 100 including a computing system 102 embodied in an accelerated processor unit (APU) 105, in accordance with some embodiments. The APU 105 includes one or more central processing unit (CPU) cores 110, one or more graphics processing unit (GPU) cores 115, a north bridge (NB) controller 120, and a skin temperature aware power management (STAPM) controller 125. The computing system 102 also includes system memory 130, a display 135, and a power supply 137 (including voltage regulator, a battery and a battery charging unit—not separately shown). The NB controller 120 provides an interface to the system memory 130. The operation of the device 100 is generally controlled by an operating system 140 including software that interfaces with the various elements of the device 100. The APU 105 integrates the CPU cores 110 and GPU cores 115 on a common semiconductor die, allowing them to share on-die resources such as the memory hierarchy and interconnect.

The device 100 includes an outer casing 145 that supports the display 135 that surround the active components of the computing system 102 and provide outer surfaces along which a user interfaces with the device 100. The APU 105 controls the display 135 and may receive user input from the display 135 for embodiments where the display 135 is a touch screen. In some embodiments, one or more temperature sensors 150 may be provided in the device 100, such as a sensor 150 proximate the casing 145 and a sensor proximate the display 135. Activity counters, such as a CPU counter 155, a GPU counter 160, and a memory counter 165 may be provided to generate device activity metrics for the components to estimate the heat they generate and how it contributes to skin temperature.

In various embodiments, the device 100 may be embodied in handheld or wearable device, such as a laptop computer, a handheld computer, a tablet computer, a mobile device, a telephone, a personal data assistant ("PDA"), a music player, a game device, and the like. To the extent certain example aspects of the device 100 are not described herein, such example aspects may or may not be included in various embodiments without limiting the spirit and scope of the embodiments of the present application as would be understood by one of skill in the art.

The STAPM controller 125 sets a dynamic power limit for the device 100 based on a determined skin temperature. Within the dynamic power limit, the STAPM controller 125 implements voltage and frequency scaling (DVFS) to adapt voltage and clock levels of the CPU cores 110 and the GPU cores 115. The STAPM controller 125 may also control the bandwidth allotted to the system memory 130 or the battery charging rate employed by the power supply 137 to control their respective heat contributions. As described in greater detail below, the STAPM controller 125 may implement an overall device power limit or separate power limits for each controlled component.

In some embodiments, the skin temperature limit is fixed and is associated with a default package power limit, DPPL, where if the device 100 were to operate at the DPPL for an extended period of time, the actual skin temperature of the device 100 would substantially reach but not exceed the skin temperature limit. In some embodiments, the skin temperature limit may be variable, depending on factors such as device state or user preferences. In such cases, the DPPL would also adjust with the skin temperature limit.

As voltage and frequency are generally coupled in the DVFS states (i.e., as voltage decreases, frequency also decreases), the DVFS states may also be referred to as simply active frequency states. The modifier active implies that the processing core 110, 115 remains in an active operational state capable of executing instructions, as compared to an inactive or powered down state where the frequency of the corresponding clock is zero. Table 1 below illustrates exemplary DVFS states for the CPU cores 110. P0-P5 represent software visible states that may be controlled by the operating system 135 or the STAPM controller 125, and Pb0-Pb1 represent hardware controlled boost states (not visible to software such as the operating system 135) that may be controlled by the STAPM controller 125. For P0-P5, P0 represents the base DVFS state, and as the state number increases, the voltage and frequency decrease, such that P5 is the lowest DVFS state. The voltages and frequencies associated with the boost states are greater than those of the base state, P0. The boost states Pb1 and Pb1 also exhibit voltages and frequencies that decrease with index number, with Pb0 being the highest boost state.

TABLE 1

CPU DVFS States

| | P-State | Voltage (V) | Frequency (MHz) |
|---|---|---|---|
| HW States | Pb0 | V1b | F1b |
| | Pb1 | V0b | F0b |
| SW-Visible States | P0 | V0 | F0 |
| | P1 | V1 | F1 |
| | P2 | V2 | F2 |
| | P3 | V3 | F3 |
| | P4 | V4 | F4 |
| | P5 | V5 | F5 |

The GPU cores 115 have independently controlled power planes that allow voltages and frequencies to be controlled independently from those associated with the CPU cores 110. In the illustrated example, the GPU cores 115 have a GPU-high state (highest frequency), a GPU-med state (medium frequency), and a GPU-low state (lowest frequency).

Figure 2:
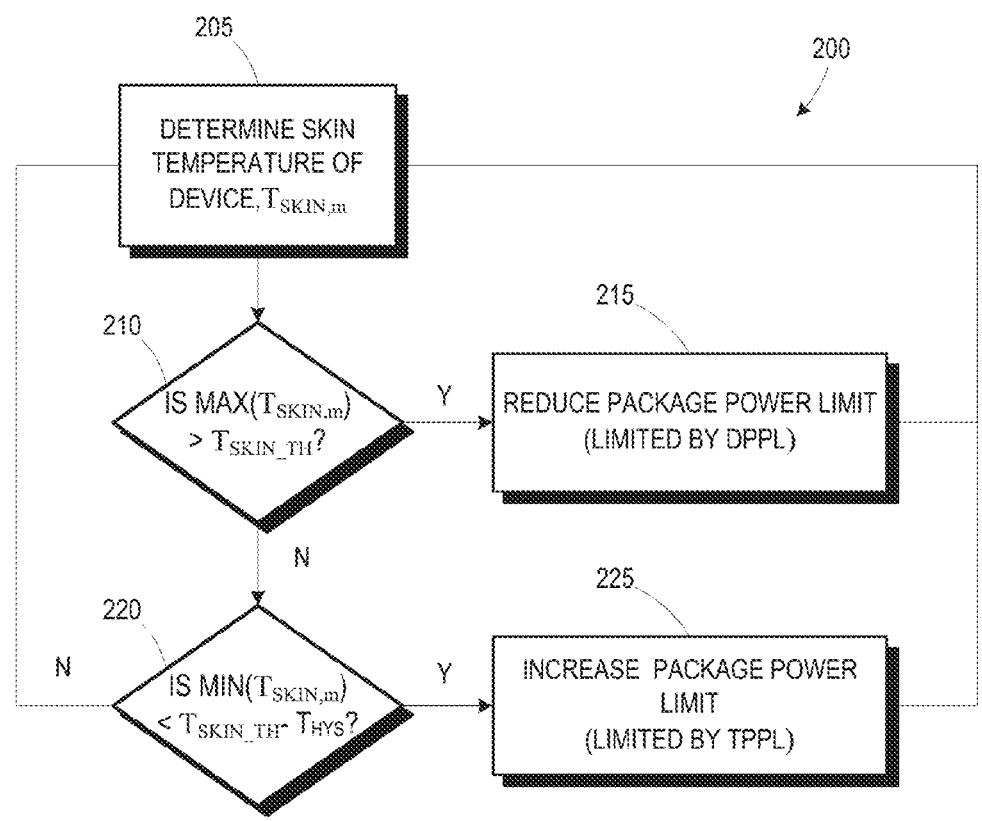
FIGS. 2 and 3 are flow diagrams of methods for controlling power limits based on skin temperature, according to some embodiments.

FIG. 2 is a flow diagram of a method 200 for setting power limits for processing components in a computing system 102 based on estimated skin temperature, in accordance with some embodiments. In method block 205, the STAPM controller 125 determines skin temperature, $T_{SKIN,m}$, at m locations of a device housing the computing system 102 (e.g., one or more locations on the casing 145 or the display 135). As will be described in greater detail below, the skin temperature may be determined using temperature sensors 150 or by employing a skin temperature model. In the case of temperature sensors 150, the sensor data might not directly read skin temperature as they may be mounted near the surface, but not actually on the surface. The thermal resistance of any material covering the sensor may generate an offset to the measured temperature.

In method block 210, the skin temperatures at the various locations are compared to a maximum skin temperature threshold, $T_{SKIN\_TH}$ (i.e., a skin temperature limit). In some embodiments, the maximum skin temperature threshold may also be location dependent, $T_{SKIN\_TH,\,m}$. For example, the display 135 may have a different skin temperature limit than the casing 145. If any of the skin temperatures exceed $T_{SKIN\_TH}$, a package power limit, PPL, for the computing system 102 is reduced. In some embodiments, the value of $T_{SKIN\_TH}$ may be fixed, and in some embodiments, it may be variable. The PPL represents the total power consumed by the components of the device 100 that are controlled plus those that are assumed to have fixed contributions. Within the envelope set by the PPL, various power management techniques may be employed to set the power states of the individual components, as described in greater detail below. In some embodiments, a graduated approach may be used in reducing the PPL, where the PPL is incrementally reduced according to a predetermined rate to allow time for the reductions in power to be realized in the skin temperature. The STAPM controller 125 may continue to reduce the PPL until the default package power limit, DPPL, is reached. In the case of variable skin temperature thresholds, the DPPL may be adjusted along with the value of the maximum skin temperature threshold. A predetermined correlation between the maximum skin temperature threshold and the DPPL may be employed.

In method block 220, the skin temperatures at the various locations are compared to the maximum skin temperature threshold, $T_{SKIN\_TH}$, minus a hysteresis offset, $T_{HYS}$. If the minimum skin temperature at the various locations is less than the hysteresis adjusted threshold, there is thermal headroom in the system and an opportunity exists to boost system performance without exceeding the skin temperature threshold. In method block 225, the PPL is increased. In some embodiments, the PPL may be increased to a maximum defined by a thermal package power limit threshold, TPPL, corresponding to the TDP limit designed to prevent damage to the silicon. In other embodiments, the increase in the PPL may also be implemented incrementally using a predetermined rate. Because the value of the TPPL threshold is determined based on silicon limits, it is not affected by changes in the maximum skin temperature threshold.

The embodiment of FIG. 2 uses a technique that manages the overall PPL based on skin temperature. In some cases, a particular component in the device 100 may be a primary contributor to skin temperature at a particular monitored location. For example, the skin temperature of a location disposed above the system memory 130 may be mostly dependent on the activity level of the memory 130, a skin temperature of a location disposed above the APU 105 may be mostly dependent on the activity level of the APU 105, or the skin temperature at a location above the power supply 137 may be mostly dependent on the charging state and rate of the battery. To facilitate finer control granularity, the STAPM controller 125 may implement component specific power limits within the envelope defined by the PPL that may be adjusted based on skin temperature and location.

Figure 3:
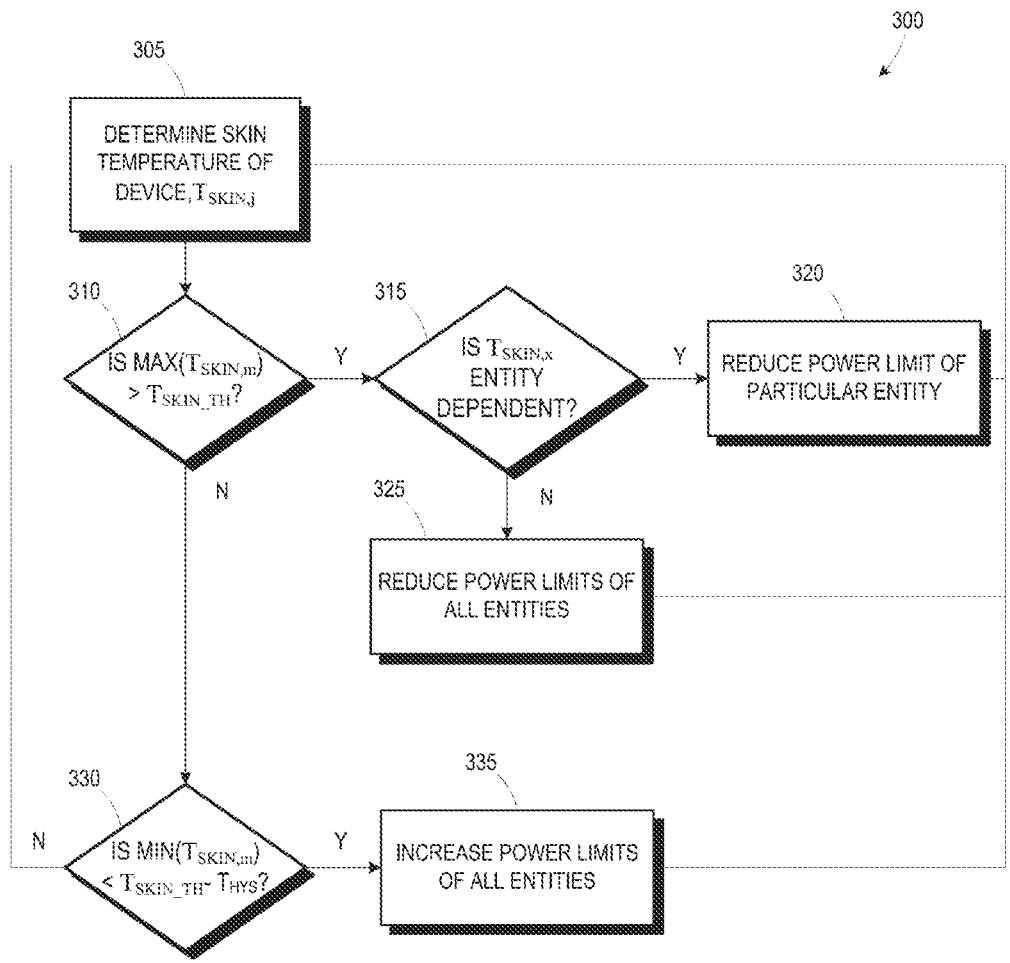

FIG. 3 is a flow diagram of a method 300 for setting individual power limits for components in a computing system 102 based on estimated skin temperature, in accordance with some embodiments. In method block 305, the STAPM controller 125 determines skin temperature, $T_{SKIN,m}$, at m locations of a device housing the computing system 102 (e.g., one or more locations on the casing 145 or the display 135).

In method block 310, the skin temperatures at the various locations are compared to a maximum skin temperature threshold, $T_{SKIN\_TH}$. Again, the skin temperature threshold may be fixed or variable. If any of the skin temperatures exceed $T_{SKIN\_TH}$, the power limit in method block 310, the particular violating location or locations ($T_{SKIN,m}$) are evaluated to determine if there is a particular component that is associated with generating heat at the particular location or locations in method block 315. If the violating location is component dependent in method block 315, the power limit of the associated component, $PLC_j$, is reduced in method block 320. For example, if the memory 130 is primary contributing component at the violating location, the STAPM controller 125 may reduce a bandwidth limit of the memory 130, where the bandwidth is directly proportional to power. If the power supply 137 is the primary contributing component, the STAPM controller 125 may reduce the battery charging rate. Hence, the bandwidth limit may represent a power limit in the context of the component power limit in method block 320. In the case of the APU 105, an APU power limit may be used or individual CPU and GPU power limits may be used. The reduction of a power limit in the APU 105 generally results in a transition to a lower DVFS state. In some embodiments, the power limits may be indirectly controlled by changing a frequency/P-state limits. For purposes of the present illustrative examples, the frequency/P-state limits are considered power limits. If the violating location is not component dependent in method block 315, the power limit of the all components are reduced in method block 325. The component power limits may be combined with a fixed power contribution for non-controlled components and subjected to a constraint based on the package power limit, PPL, during the manipulation of the component power limits.

$$\Sigma_{j=1}^{J} PLC_j PWR_{STATIC} < PPL$$

In method block 330, the skin temperatures at the various locations are compared to the maximum skin temperature threshold, $T_{SKIN\_TH}$, minus a hysteresis offset, $T_{HYS}$. If the minimum skin temperature at the various locations is less than the hysteresis adjusted threshold, there is thermal headroom in the system and an opportunity exists to boost system performance without exceeding the skin temperature threshold. In method block 335, the power limits of all components are increased. In some embodiments, the component power limits may be increased to maximum component power limits for each component corresponding to a TDP limit for each component designed to prevent damage to the silicon. In some embodiments, the increase in the component power limits may also be implemented incrementally using a predetermined rate.

Within the operating envelope defined by the package power limit or individual component power limits, various approaches may be used to control the actual device power state (e.g., the CPU and GPU power states described above). In one embodiment, the DVFS states for the APU 105 may be boosted to maximize use of the total thermal capacity, a concept referred to as greedily allocating the power within the thermal budget. If the maximum skin temperature threshold is not reached, power is allocated until maximum CPU and GPU frequencies and memory bandwidth are reached. In other embodiments, a frequency sensitive approach may be used to adjust the DVFS states.

In the case of the battery charging rate, the STAPM controller 125 may preferentially allocate power to the power supply 137 based on the activity states of the other components. For example, during periods of low APU 105 activity, the charging rate employed by the power supply 137 may be increased to charge the battery more quickly without negatively impacting system performance. During periods of high APU 105 activity, the charging rate may be reduced to allow any available thermal headroom to be employed to increase the performance of the computing system 102. In the embodiment of FIG. 2, the STAPM controller 125 may directly control the charging rate to address the heat contribution of the power supply 137, while in the embodiment of FIG. 3, the STAPM controller 125 may use a component-level power limit for the power supply 137, and the power supply 137 may control the charging rate based on its assigned power limit.

In some embodiments, it may not be feasible to provide temperature sensors 150 in the device 100. To facilitate skin temperature analysis, a skin temperature model may be used that correlates component activity levels to skin temperature at the plurality of locations. In general, there is a path that heat generated by a component is conducted through the device until it is apparent as skin temperature at a particular location. This heat path may be modeled using an electric circuit analogy, where current is analogous to heat power and voltage is analogous to temperature. Each layer, represented by an index, i, of the device between the heat generating component and the skin temperature location may be represented by a characteristic thermal resistance parameter, $R_{th(i)}$, and a parallel characteristic thermal capacitance parameter, $C_{th(i)}$. A thermal time constant associated with the layer may be represented by the product of the thermal resistance and capacitance, $\tau_i = R_{th_i} C_{th_i}$.

Figure 4:
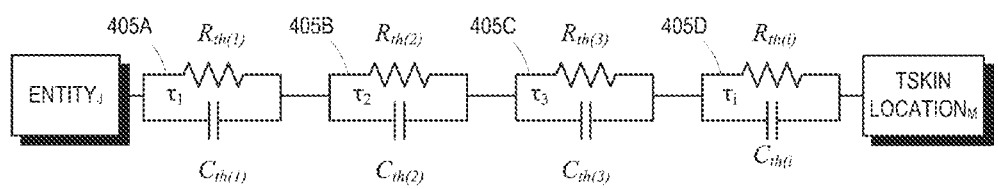
FIG. 4 is a diagram of a thermal ladder circuit analogy for modeling thermal characteristics of layers in the device of FIG. 1, according to some embodiments.

FIG. 4 illustrates a thermal ladder circuit analogy 400 for the layers in the device 100 for a given component and skin temperature location. The thermal ladder circuit analogy 400 represents a Foster RC network. The particular number of layers employed and the characteristics of each layer depend on the particular construction of the device. For example, the packages for the APU 105 and the memory 130 may be mounted on a circuit board. A heat spreader may be provided above on or both of the packages. A skin spreader may be provided on the casing 145. A midframe may be used to support the printed circuit board. The various configurations for the heat dissipating elements and the orientation of the printed circuit board may vary (e.g., facing the casing 145 or facing the display 135). Each layer is represented by an RC pair 405A-405D.

Based on the thermal model circuit analogy 400, the skin temperature model for skin temperature at a plurality of locations is defined by the equations:

$$\Delta T_{m,n} = \sum_{i=1}^{I}\sum_{j=1}^{J} \frac{2\tau_{m,i,j} - \Delta t}{2\tau_{m,i,j} + \Delta t}\Delta T_{m,n-1} + \frac{R_{th_{m,i,j}}\Delta t}{2\tau_{m,i,j} + \Delta t}(STATE_{j,n} + STATE_{j,n-1})$$

$$T_{SKINm,n} = T_{amb} + T_{sys} + \Delta T_{m,n},$$

where the equation parameters are:
n=indicator of the discretized time variable;
m=integer, variable defining the skin temperature location;
M=integer, total number of skin temperature locations;
i=integer, ladder in the Foster RC network;
I=integer, total number of ladders in in the Foster RC network;
j=integer, number of heat generating component;
J=integer, total number of components;
Δt=sampling time (also known as $T_s$);
τ=time constant pertinent to RC ladders and cross-heating components;
$R_{th}$=thermal resistance pertinent to RC ladders and cross-heating components;
$STATE_{j,n}$=time-dependent variable indicating thermal component heat power;
$T_{amb}$=Ambient temperature (fixed value or measured); and
$T_{sys}$=static non-thermal component temperature rise of the system.

In some embodiments, the ambient temperature and the static system temperature referenced in Equation 2 are assumed to be constant values. In other embodiments, the ambient temperature may be measured. For example, an initial reading from a temperature sensor 150 taken during system initialization may be used as the ambient temperature if the system is cold. A thermally shielded temperature may also be used to dynamically measure and update the ambient temperature.

The thermal resistance and time constant parameters may be determined empirically for a given device design. For each layer, i, the thermal resistance value can be obtained using cold start and steady state values of the temperature response based on the following formula:

$$R_{th} = \frac{T_{steady} - T_{coldstart}}{STATE_{steady} - STATE_{coldstart}}.$$

The values for τ, can be calculated based on the time that the temperature value hits approximately 63.2% of its steady state value (i.e., the time required for the system's step response to reach 1-1/e of its final asymptotic value).

When determining the heat power related contribution of each component, $STATE_j$, models relating activity to heat power (i.e., in watts) may be used. In some embodiments, the STAPM controller 125 may track heat power contributions of the APU 105, the system memory 130, and the display 135. The STAPM controller 125 may employ the CPU counter 155 (CPU_CNT), the GPU counter 160 (GPU_CNT) and the memory counter 165 (MEM_CNT) to generate activity metrics. The counters 155, 160, 165 may be distributed as illustrated in FIG. 1, or they may be integrated into the STAPM controller 125. The functional components can push the counter data to the STAPM controller 125 or the STAPM controller 125 can poll the functional components for the counter data. In some embodiments, some functions of the STAPM controller 125 may be implemented using software (e.g., in the operating system 135). For example, the software may poll the counters and inform the STAPM controller 125.

A heat power function is determined for each component that relates component power to activity as follows:

$STATE_{APU}=f(CPU\_CNT,GPU\_CNT,$BaseLeakage, $V,F,APU$ Temperature), where BaseLeakage is the thermal leakage of the APU 105 under certain test conditions of voltage and temperature, F and V define the DVFS state at the given instant, and APU temperature is the operating temperature of the APU 105 at the given instant reported by integrated thermal sensors. The model function may be generated using a linear model with weighting parameters determined based on actual power measurements from a target device;

$STATE_{MEMORY}=$NumDimms*(Dynamic+Leakage power per DIMM/module), where:

Dynamic Power per DIMM/module= $Ddr$PowerSlope*% Utilization*$VDDIO^2$* MemClkFreq;

Leakage Power per DIMM/module= $Ddr$PowerOffset*VDDIO;

DdrPowerSlope and DdrPowerOffset are coefficients characterized based on actual memory power measurements on the target memory modules, VDDIO is the memory device voltage, MemClkFreq is the memory clock frequency, and % Utilization is a metric derived from MEM_CNT that is a ratio of the number of memory busy cycles to the total number of memory cycles;

$STATE_{DISPLAY}=$Alpha*AvgBackLight %+ Beta*AvgRefreshRate+Gamma, where Alpha, Beta, Gamma are model coefficients characterized based on actual power measurements on the target display panel,
AvgBackLight % and AvgRefreshRate are moving averages of backlight and refresh rate values read from control registers in a display controller unit of the APU 105; and $STATE_{PS}=f($ChgState,ChgRate$)$ where ChgState is the charging state of the power supply 137 and ChgRate is the charging rate employed to charge the battery.

Various approaches may be employed to setting the maximum skin temperature thresholds, $T_{SKIN\_TH}$, described above and the power thresholds associated therewith. In some embodiments, the maximum skin temperature threshold is fixed, resulting in fixed values for the minimum package power limit threshold, $PWR_{MIN}$ and any component minimum power limit thresholds employed. In some embodiments, the maximum skin temperature threshold may be dynamically set based on factors such as device state or user preferences. Changing the maximum skin temperature threshold results in a change to the default package power limit threshold, DPPL. In general, increasing the maximum skin temperature results in an increase in the achievable performance of the computing system 102 because hotter operation is allowed.

Figure 5:
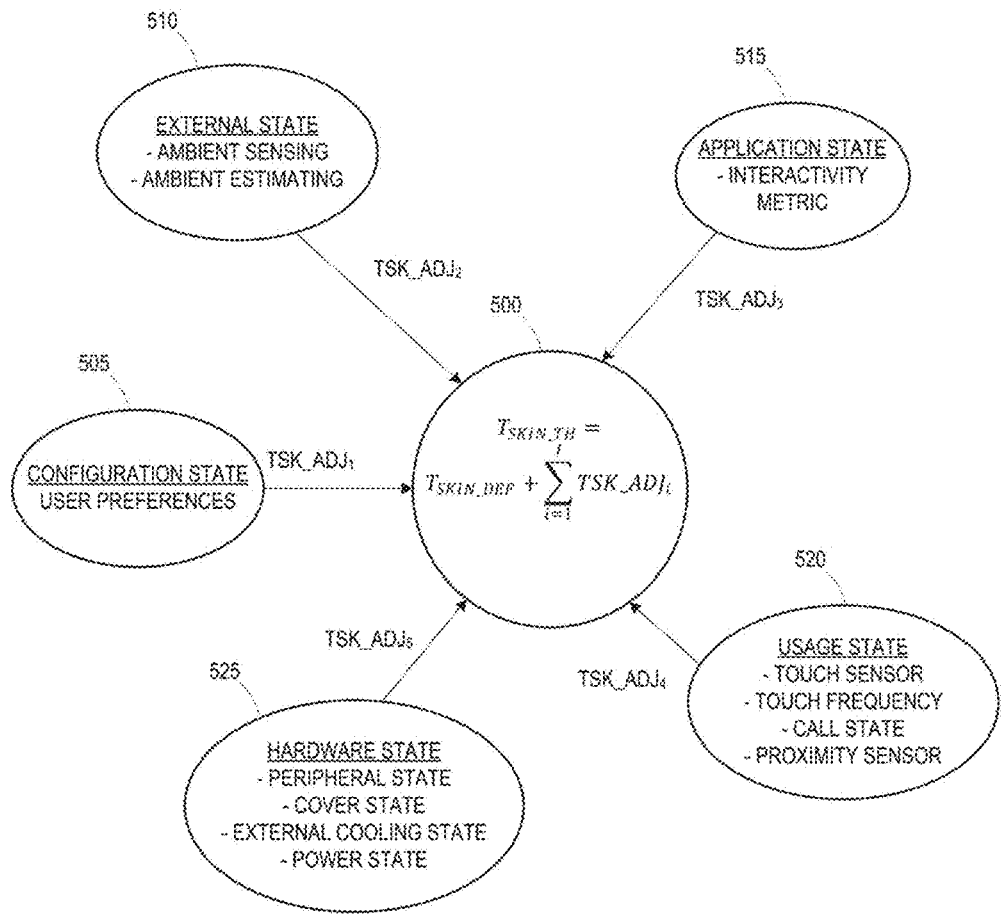
FIG. 5 is a diagram illustrating the adjustment of the skin temperature threshold based on a device state, in accordance with some embodiments.

FIG. 5 is a diagram illustrating the adjustment of the skin temperature threshold based on a device state, in accordance with some embodiments. A default skin temperature threshold, $T_{SKIN\_DEF}$, (i.e., or set of different thresholds for different locations) is adjusted based on a plurality of device state factors as represented in block 500. The individual device state factors may include a configuration state adjustment 505, an external state adjustment 510, an application state adjustment 515, a usage state adjustment 520, and a hardware state adjustment 525. The adjustments are summed in block 500 to generate a dynamic value for the skin temperature threshold. The default package power limit, DPPL, described above may be also adjusted as a function of the adjusted skin temperature threshold using a predetermined equation or look-up table. In some embodiments, not all of the adjustments 505-525 may be implemented by the STAPM controller 125.

The configuration state adjustment 505 is generated based on user preference data. A user may be queried to ascertain how the user perceives the temperature of the device 100. The user may be presented with a skin temperature menu with the choices, "Run Warmer", "Run Cooler", or "Do not change". In some embodiments, the user may be automatically queried after the device 100 is determined as having reached the skin temperature threshold based on measurements or based on having been operating at the DPPL for an extended period of time. In some embodiments, the user may access the relative skin temperature adjustment choices in a settings input screen. An automatic querying of the user may be repeated periodically or after other adjustments are made to the skin temperature threshold based on the other device state adjustment factors described below. Based on the user selection, an adjustment factor, $TSK\_ADJ_1$, may be generated to modify the default skin temperature threshold. In the case of multiple skin temperature thresholds for different locations, the same adjustment factor may be applied to all of the location thresholds.

The external state adjustment 510 is based on the ambient conditions of the device 100. The skin temperature model equation described above includes an ambient temperature component, $T_{amb}$. In some embodiments, the ambient temperature component is assumed to be a fixed value. In some embodiments, one of the temperature sensors 150 may be thermally shielded from the heat generating components of the device 100 such that it directly measures the ambient temperature of the surrounding environment. In some embodiments, the ambient temperature may be inferred using location data or network connectivity data for the device 100. For example, the GPS position of the device 100 may be employed to determine the ambient temperature of the surroundings based on weather data retrieved by an application executing on the device 100 if the user is determined to be outdoors. If the user is determined to be indoors an assumed value for the ambient temperature may be used. For example, if the device 100 is connected to communication network designated by the user as a work network, it is likely that the user is located indoors. An ambient temperature adjustment factor, $TSK\_ADJ_2$, may be generated by subtracting the determined ambient temperature from a default value. If the determined ambient temperature value is less than the default value, a positive offset to the skin temperature limit is generated. If the determined ambient temperature value is greater than the default value, a negative offset to the skin temperature limit is generated. In some embodiments, where the skin temperature is measured instead of being modeled, the ambient temperature need not be monitored or estimated and the adjustment factor of block 510 may be ignored.

The application state adjustment 515 is generated based on the types of applications being executed by the computing system 102. Different types of applications inherently involve different levels of user interaction. To facilitate skin temperature threshold adjustments, different types of applications may be assigned relative interactivity metrics. The interactivity metric may be used to determine the magnitude of the adjustment factor, $TSK\_ADJ_3$, generated by the application state block 515. Applications that typically involve frequent user interactions, such as an email application, a web browser, or a video game may be associated with a "high" interactivity metric that involves little or no skin temperature threshold adjustment, because it is likely that the user will frequently interact with the device 100. Other applications, such as video playback applications, tend to have fewer user interaction once started corresponding to a "low" interactivity metric, allowing a more aggressive, or higher adjustment to the skin temperature threshold to provide increased playback performance. Other applications fall into a "medium" interactivity range that require intermittent user interactions, such as an e-book reader or a recipe display application, resulting in a medium level skin temperature adjustment. The particular temperature adjustment amounts associated with the high, medium, and low interactivity metrics may vary depending on the particular implementation. The configuration settings described in block 505 may also include user-defined adjustments associated with interactivity metrics.

The usage state adjustment 520 is based on data indicating how the user is currently employing the device 100. Because the display 135 acts a user input device, the STAPM controller 125 monitors the touch frequency associated with the user interactions. In some embodiments, a touch sensor may be present in the device 100, such as on the casing 145 to generate a casing touch frequency. The touch frequency may be used to generate an interactivity metric similar to the application interactivity metric described above. However, the touch frequency is an actual measurement of interactivity as opposed to the indirect measurement provided by the application metric. Thus, the measured touch interactivity metrics may be used in place of the application interactivity metrics and the application state adjustment 515 may be ignored. Similar to the application interactivity metrics, the touch frequency interactivity metrics may be associated with "high", "medium", and "low" interactivity thresholds and associated skin temperature adjustments, $TSK\_ADJ_4$. Using the combination of the display 135 touch frequency and the casing 145 touch frequency, the STAPM controller 125 may determine how the user is employing the device 100 and where the device 100 is being touched. If separate skin temperature thresholds are implemented for the casing 145 and the display 135, the STAPM controller 125 may preferentially increase the skin temperature threshold associated with the location having the lowest touch interactivity metric.

In some embodiments, the call state may also be a measure of user interactivity. For example, if the user is actively engaged in a call, they are likely to be touching both the casing 145 (i.e., hand) and the display 135 (i.e., face). Thus, during a call, the "high" interactivity adjustment factor may be used. However, if the user is using a remote device, such as a headset, for placing the call, there is likely to be little actual touching of the device 100, and the "low" interactivity adjustment factor may be used.

In some embodiments, a proximity sensor may be employed to detect the user's presence as an indication of user interactivity. For example, a camera or other sensor may sense motion proximate the device 100, thus indicating an increased likelihood of the user intending to interact with the device 100. If user proximity is detected the "high" or "medium" interactivity adjustment factor may be used. However, if user proximity is not detected, the "low" interactivity adjustment factor may be used.

The hardware state adjustment 525 is generated based on the physical state of the device 100 and how it is interconnecting with other devices. For example, if a peripheral device, such as a headset or a docking station, is being employed, if a cover is attached to the device 100 (i.e., based on sensor input or user configuration), or if the device 100 is connected to external power, a positive skin temperature adjustment factor, $TSK\_ADJ_5$, may be employed. These factors may be associated with increased cooling performance or increased thermal resistance, thereby allowing hotter operation of the device 100. For example, a peripheral device may have its own cooling fan or the presence of external electrical power may allow an increased fan speed for an internal fan of the device 100, if so equipped. In the case of a cover, there is increased thermal resistance in the heat path between the heat generating components in the computing system 102 and the touch surfaces, such as the casing 145. If the peripheral device is a docking station or stand, it is likely that there will be very little user interaction. The hardware state may be sensed by the device 100 or set by the user. The particular values for the hardware state adjustment 525 may depend on the particular implementation or on the particular hardware state (e.g., cover versus docking station).

In block 500, the device state skin temperature threshold adjustments 505-525 are summed. In some embodiments, not all of the adjustments 505-525 may be implemented or enabled. The user may specify in the configuration data the particular values for the adjustments or the selective enabling of the various adjustments.

In some embodiments, the skin temperature threshold adjustment 500 may be employed with skin temperature aware power management, where selective boosting above the adjusted DPPL is allowed to take advantage of thermal headroom. In some embodiments, the skin temperature threshold adjustment in block 500 may be employed with a static skin temperature management approach, where the value of the DPPL is correlated with the maximum skin temperature (i.e. adjusted in block 500), but the actual skin temperature is neither sensed nor estimated and boosting of the device 100 above the adjusted package power limit is not allowed.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
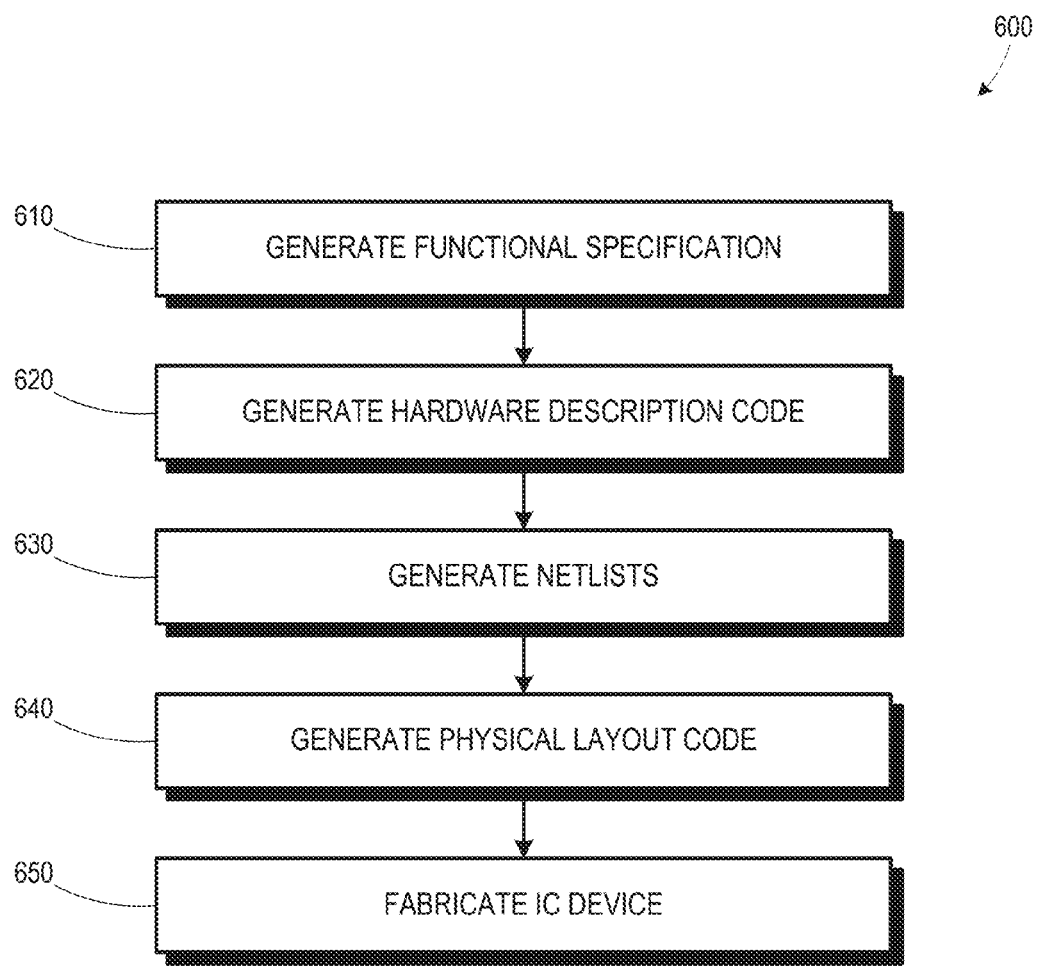
FIG. 6 is a flow diagram illustrating a method for designing and fabricating an integrated circuit device implementing at least a portion of a component of a processor, according to some embodiments.

FIG. 6 is a flow diagram illustrating an example method 600 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 610 a functional specification for the IC device is generated. The functional specification (often referred to as a micro architecture specification (MAS)) may be represented by any of a variety of programming languages or modeling languages, including C, C++, SystemC, Simulink, or MATLAB.

At block 620, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 630 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 640, one or more EDA tools use the netlists produced at block 630 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 650, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments, a method includes controlling a power limit of a computing system based on a determined skin temperature of at least one location on an outer surface of a device housing the computing system.

As disclosed herein, in some embodiments, a processor includes a processing unit and a power management controller to control a power limit of the processing unit based on a determined skin temperature of at least one location on an outer surface of a device housing the processor.

As disclosed herein, in some embodiments, a device includes a casing, a display supported by the casing, a processing unit mounted within the casing, and a power management controller to control a power limit of the processing unit based on a determined skin temperature of at least one location on an outer surface of the casing or the display.

As disclosed herein, in some embodiments a non-transitory computer readable media stores code to adapt at least one computer system to perform a portion of a process to fabricate at least part of a processor. The processor includes a processing unit and a power management controller to control a power limit of the processing unit based on a determined skin temperature of at least one location on an outer surface of a device housing the processor.

As disclosed herein, in some embodiments, a method includes adjusting a maximum skin temperature threshold of a device based on a device state, adjusting a power limit for the device based on the adjusted maximum skin temperature threshold, and operating the device based on the adjusted power limit.

As disclosed herein, in some embodiments, a processor includes a processing unit and a power management controller to adjust a maximum skin temperature threshold based on a device state and adjust a power limit for the processing unit based on the adjusted maximum skin temperature threshold.

As disclosed herein, in some embodiments a non-transitory computer readable media stores code to adapt at least one computer system to perform a portion of a process to fabricate at least part of a processor. The processor includes a processing unit and a power management controller to adjust a maximum skin temperature threshold based on a device state and adjust a power limit for the processing unit based on the adjusted maximum skin temperature threshold.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

The use of skin temperature aware power management allows the opportunistic use of the time varying thermal headroom of the device 100 to boost the APU 105 and, hence, to improve performance. This boosting improves the user experience from a performance standpoint without negatively impacting that experience from a comfort standpoint.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   determining a skin temperature at a location at an outer surface of a device housing a computing system using a skin temperature model that models skin temperature at least in part as a function of heat power generated by a plurality of components of the computing system, wherein determining the skin temperature includes:
   estimating heat power generated by each component of the plurality of components based on an activity metric associated with the component;
   identifying an application type for an application executing on the device;
   determining an interactivity metric for the application based on the application type, the interactivity metric associated with an amount of user interactivity with the device;
   determining an interactivity adjustment factor based on the interactivity metric; and
   summing contributions of the heat power of each component of the plurality of components and the interactivity adjustment factor to determine the skin temperature at the location; and
   controlling a power limit of the computing system based on the skin temperature.

2. The method of claim 1, further comprising:
   determining the skin temperature at the location further using a temperature sensor positioned proximate the outer surface.

3. The method of claim 1, wherein controlling the power limit comprises decreasing an individual power limit for a selected component of the plurality of components responsive to the skin temperature being greater than a skin temperature threshold and the selected component of the plurality of components being designated as a primary contributor to skin temperature at the location.

4. The method of claim 1, wherein controlling the power limit comprises increasing an individual power limit for a selected component of the plurality of components responsive to the skin temperature being less than a skin temperature threshold.

5. The method of claim 1, further comprising:
   determining a plurality of skin temperatures at a plurality of locations at the outer surface, wherein controlling the power limit comprises increasing the power limit responsive to a minimum skin temperature of the plurality of skin temperatures being less than a skin temperature threshold minus a hysteresis offset.

6. The method of claim 1, wherein controlling the power limit comprises decreasing the power limit responsive to the skin temperature being greater than a skin temperature threshold.

7. The method of claim 1, further comprising:
   determining a plurality of skin temperatures at a plurality of locations on the outer surface, wherein controlling the power limit comprises decreasing the power limit responsive to a maximum skin temperature of the plurality of skin temperatures being greater than a skin temperature threshold.

8. The method of claim 1, wherein determining the skin temperature further includes polling each of the plurality of components for the respective activity metric.

9. The method of claim 1, wherein determining the skin temperature further includes causing each of the plurality of components to push respective activity metrics to an activity counter coupled to a power management controller to control the power limit of the computing system based on the skin temperature.

10. The method of claim 1, wherein determining the skin temperature further includes determining a software visible state for a core of a CPU, wherein the method further comprises:
    operating the CPU of the computing system according to a dynamic voltage frequency scaling (DVFS) based on the software visible state and the power limit of the computing system.

11. The method of claim 1, wherein controlling the power limit of the computing system is based on a skin temperature hysteresis offset to a skin temperature threshold.

12. A processor, comprising:
    a processing unit; and
    a power management controller to:
    determine a skin temperature at a location at an outer surface of a device housing the processor using a skin temperature model that models skin temperature at least in part as a function of heat power generated by a plurality of components of the device, wherein the power management controller is to determine the skin temperature by:
    estimating heat power generated by each component of the plurality of components based on an activity metric associated with the component;
    identifying an application type for an application executing on the device;
    determining an interactivity metric for the application based on the application type, the interactivity metric associated with an amount of user interactivity with the device;
    determining an interactivity adjustment factor based on the interactivity metric; and
    summing contributions of the heat power of each component of the plurality of components and the interactivity adjustment factor to determine the skin temperature at the location; and
    control a power limit of the processing unit based on the skin temperature.

13. The processor of claim 12, wherein the power management controller is to determine the skin temperature further based on received temperature sensor data for the location.

14. The processor of claim 12, wherein the power management controller is to decrease an individual power limit for a selected component of the plurality of components responsive to the skin temperature being greater than a skin temperature threshold and the selected component of the plurality of components being designated as a primary contributor to skin temperature at the location.

15. The processor of claim 12, wherein the power management controller is to increase an individual power limit for a selected component of the components responsive to the skin temperature being less than a skin temperature threshold.

16. The processor claim 12, wherein the power management controller further is to determine a plurality of skin temperatures at a plurality of locations on the outer surface and control the power limit by increasing the power limit responsive to a minimum skin temperature of the plurality of skin temperatures being less than a skin temperature threshold minus a hysteresis offset.

17. The processor of claim 12, wherein the power management controller is to decrease the power limit responsive to the skin temperature being greater than a skin temperature threshold.

18. The processor of claim 12, wherein the power management controller is to determine a plurality of skin temperatures at a plurality of locations on the outer surface and control the power limit by decreasing the power limit responsive to a maximum skin temperature of the plurality of skin temperatures being greater than a skin temperature threshold.

19. The device housing the processor of claim 12.

* * * * *